United States Patent
Mishra et al.

(10) Patent No.: US 11,914,629 B2
(45) Date of Patent: Feb. 27, 2024

(54) PRACTICAL SUPERVISED CLASSIFICATION OF DATA SETS

(71) Applicant: BASF SE, Ludwigshafen (DE)

(72) Inventors: Arunav Mishra, Ludwigshafen (DE); Henning Schwabe, Ludwigshafen (DE); Lalita Shaki Uribe Ordonez, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 18 days.

(21) Appl. No.: 17/394,994

(22) Filed: Aug. 5, 2021

(65) Prior Publication Data

US 2022/0043850 A1 Feb. 10, 2022

(30) Foreign Application Priority Data

Aug. 7, 2020 (EP) .................................. 20190061

(51) Int. Cl.
  *G06F 16/35* (2019.01)
  *G06F 16/338* (2019.01)
  *G06N 20/00* (2019.01)

(52) U.S. Cl.
  CPC ............ *G06F 16/35* (2019.01); *G06F 16/338* (2019.01); *G06N 20/00* (2019.01)

(58) Field of Classification Search
  CPC .. G06F 16/338; G06F 16/3346; G06F 16/353; G06F 16/958; G06N 20/00; G06N 5/025; G06N 7/01
  See application file for complete search history.

(56) References Cited

U.S. PATENT DOCUMENTS

| | | | |
|---|---|---|---|
| 7,287,012 B2 * | 10/2007 | Corston | G06F 16/3346 707/E17.058 |
| 7,818,186 B2 * | 10/2010 | Bonissone | G06Q 10/10 705/2 |

(Continued)

FOREIGN PATENT DOCUMENTS

WO WO-2013188718 A2 * 12/2013 ......... G06K 9/00369

OTHER PUBLICATIONS

European Search Report for 20190061.0 dated Dec. 22, 2020, 9 pages.

*Primary Examiner* — Yuk Ting Choi
(74) *Attorney, Agent, or Firm* — Lowenstein Sandler LLP (57) ABSTRACT

The present invention relates to information retrieval. In order to facilitate a search and identification of documents, there is provided a computer-implemented method for training a classifier model for data classification in response to a search query. The computer-implemented method comprises:
  a) obtaining a dataset that comprises a seed set of labeled data representing a training dataset;
  b) training the classifier model by using the training dataset to fit parameters of the classifier model;
  c) evaluating a quality of the classifier model using a test dataset that comprises unlabeled data from the obtained dataset to generate a classifier confidence score indicative of a probability of correctness of the classifier model working on the test dataset;
  d) determining a global risk value of misclassification and a reward value based on the classifier confidence score on the test dataset;
  e) iteratively updating the parameters of the classifier model and performing steps b) to d) until the global risk (Continued)

value falls within a predetermined risk limit value or an expected reward value is reached.

9 Claims, 6 Drawing Sheets

(56) References Cited

U.S. PATENT DOCUMENTS

| | | | | |
|---|---|---|---|---|
| 9,311,599 B1* | 4/2016 | Attenberg | ................ | G06N 5/02 |
| | | | | 707/E17.058 |
| 2012/0078825 A1* | 3/2012 | Kulkarni | ........... | G06F 16/24578 |
| | | | | 706/12 |
| 2015/0195171 A1* | 7/2015 | Mermoud | ............... | H04L 43/10 |
| | | | | 370/253 |
| 2015/0242761 A1* | 8/2015 | Amershi | ............ | G06F 2218/12 |
| | | | | 706/11 |
| 2016/0071017 A1* | 3/2016 | Adjaoute | ........... | G06Q 20/4016 |
| | | | | 706/52 |
| 2019/0236492 A1* | 8/2019 | Saha | .................... | G06F 40/295 |
| | | | | 707/E17.058 |
| 2019/0278894 A1* | 9/2019 | Andalo | ................. | G06V 10/82 |
| | | | | 707/E17.058 |
| 2020/0279171 A1* | 9/2020 | Mazzoleni | ............. | G06N 5/022 |
| | | | | 707/E17.058 |
| 2021/0287222 A1* | 9/2021 | Schmidt | ............. | G06F 18/2413 |
| | | | | 707/E17.058 |

* cited by examiner

PRACTICAL SUPERVISED CLASSIFICATION OF DATA SETS

CROSS-REFERENCE TO RELATED APPLICATION(S)

This application claims the benefit of priority of European Patent Application No. 20190061.0, filed on Aug. 7, 2020, the disclosure of which is hereby incorporated by reference herein in its entirety.

FIELD OF THE INVENTION

The present invention generally relates to information retrieval and in particular to a computer-implemented method for training a classifier model for data classification in particular in response to a search query, a computer-implemented method for data classification in particular in response to a search query, an apparatus for data classification in response to a search query, an information retrieval system, a computer-implemented method of predicting quality of a product, a computer program element, and a computer readable medium.

BACKGROUND OF THE INVENTION

In, for example, technology monitoring, documents have to be filtered quickly and with minimum reading effort to find the most important ones for the use case.

Search tools return a list of documents in response to a search query. The documents from the list may be ranked according to their relevance to the search query. For example, highly relevant documents may be ranked higher than, and may be displayed in a list above, documents of a lesser relevance. This allows a user to quickly and conveniently identify the most relevant documents retrieved in response to the query.

Existing supervised binary machine learning classifiers used to filter out irrelevant documents from search results may suffer two deficits. The first deficit may be poor separation of classes leads to many documents left to read, namely low precision and recall. The second deficit may be no measure to estimate the deployment risk of false negatives in the irrelevant class, namely risk of overlooking of relevant items during deployment of trained classifier. In practice, the number of false negatives is determined after the fact by intellectually checking all the items, which defeats the purpose of saving effort.

Classification problems exist also in industries in particular chemical industries, e.g. in quality control during production. Misclassifications in such an environment may be highly problematic, and may lead to increased waste and increased costs. Currently, the classification quality can only be enhanced by increasing the data pool for training. This is not always possible for industrial applications. Thus, there is a need to make classification applicable in chemical industries.

SUMMARY OF THE INVENTION

There may be a need to facilitate a search and identification of documents. There may also be a need to facilitate classification in industrial processes.

The object of the present invention is solved by the subject-matter of the independent claims, wherein further embodiments are incorporated in the dependent claims. It should be noted that the following described aspects of the invention apply also for the computer-implemented method for training a classifier model for data classification in particular in response to a search query, the computer-implemented method for data classification in particular in response to a search query, the apparatus, the information retrieval system, the computer-implemented method of predicting quality of a product, the computer program element, and the computer readable medium. It should be noted, although the description often provides document classification in response to a query as an example, the method is applicable to classifier problems mentioned below.

According to a first aspect of the present invention, there is provided a computer-implemented method for training a classifier model for data classification, in particular in response to a search query. The computer-implemented method comprises:

a) obtaining a dataset that comprises a seed set of labeled data representing a training dataset;
b) training the classifier model by using the training dataset to fit parameters of the classifier model;
c) evaluating a quality of the classifier model using a test dataset that comprises unlabeled data from the obtained dataset to generate a classifier confidence score indicative of a probability of correctness of the classifier model working on the test dataset;
d) determining a global risk value of misclassification and a reward value based on the classifier confidence score on the test dataset;
e) iteratively updating the parameters of the classifier model and performing steps b) to d) until the global risk value falls within a predetermined risk limit value or an expected reward value is reached.

In other words, a method is proposed for training a classifier model for data classification in a dataset. The dataset may comprise one or more of text data, image data, experimental data from chemical, biological, and/or physical experiments, plant operations data, business operations data, and machine-generated data in log files. In particular, the dataset may comprise sensor data.

For training the classifier model, the training inputs for the classifier mode include a seed set of labeled training data obtained from a dataset. For example, the query may be received from a user via a user interface or may be automatically generated. A list of initial documents that are generally relevant to the query is generated. These initial documents may be identified according to a frequency with which query terms occur within the initial documents, the proximity with which query terms occur within the initial documents, and/or other factors. The list of initial documents then form the dataset. The user may select a list of relevant and irrelevant documents from the initial documents and annotate them via the user interface. The labeled relevant and irrelevant documents then form a seed set of training data. The classifier is then trained on the seed data set. A large unlabeled data set drawn from the same set as the training set is used as test dataset.

In another example, sensor data e.g. from an inspection camera supervising a product, may be provided, which form a list of data general relevant for the classification problem. Labels may be provided according to the quality of the product meeting a quality criterion to a portion of the provided sensor data. The labeled relevant and irrelevant data then form a seed set of training data. The classifier is then trained on the seed data set. A large unlabeled data set may be drawn from the same set as the training set is used as test dataset.

The terms relevant/irrelevant may be understood as two labels. With respect to documents, the classes may reflect the relevancy with respect to a search query, with respect to technical application properties the labels may refer to meeting requirements or not meeting requirements. Such requirements may be technical specifications or quality criteria.

It is also proposed for estimating the deployment risk for a classifier a-priori, i.e. before classifier deployment, by estimating the parameter set where the risk of over-looking a false negative is minimal. In other words, a measure is provided to estimate the deployment risk of false negatives in the irrelevant class, namely risk of overlooking of relevant items during deployment of trained classifier. This will be explained hereafter and in particular with respect to the embodiments shown in FIGS. 2 and 3.

Further, it is proposed for estimating a reward value based on the classifier confidence score. The reward value may reflect human effort being saved on review, e.g. the reduced number of documents left to read. This will be explained hereafter and in particular with respect to the embodiments shown in FIGS. 2 and 3.

The proposed training method thus provides foundation for decision on risk vs. reward of deployment of the classifier for a given use case in the training phase, and also provides stop criteria (i.e. the global risk value falls within a predetermined risk limit value or an expected reward value is reached), so training effort of classifier can be minimized. By providing transparent quantitative foundation for deployment decision, it is expected to remove a practical hurdle to data classification applications. As a result, the proposed method may act as a key enabler in multiplying data classification applications.

For example, if positive class of classifier results is subject to intellectual review by human (e.g. reading of patents in technology monitoring), the proposed method may help to maximize the human effort being saved on review given an acceptable risk of false negatives.

The proposed training method may allow for training with a smaller training data set, but the trained classifier model still has a satisfactory performance given an acceptable risk of false negatives. This may be particularly beneficial for training a classifier model for analyzing e.g. experimental data, operations data and quality control of solids, because a smaller training data set means that less labor-intensive experiments are required to be performed and less manual labeling is required in order to create the training dataset. Additionally, drift in production (e.g. variation of control parameters) may influence the quality of the classifier model. In such cases, the classifier model may need to be retrained, usually with a smaller set of training data.

Some examples of classifier models used for analyzing experimental data, operation data, and quality control are described below.

Image-Based Plant Disease Detection

Crop diseases are a major threat to food security, but their rapid identification remains difficult in many parts of the world due to the lack of the necessary infrastructure. Plant diseases and pests identification can be carried out by means of digital image processing. For example, the images may be input into a pre-trained Convolutional Neural Network (CNN) network to obtain image characterization features, and the acquired features are then input into a machine learning classifier, e.g., Support Vector Machine SVM, for classification.

Prediction of Properties of a Chemical Mixture.

Chemical mixtures, such as automotive paints, nutrition multi-component mixture, etc., are commonly formulated to achieve desirable properties represented by property measurements. For example, an automotive paint or coating formulation comprises a complex mixture of colorants (tints), binders, additives and solvents formulated to provide a balance of properties for colour match, appearance, durability, application, and film properties. Classifier models may be used for quantitative prediction of the colour of a mixture, and other properties.

Fault Detection of Battery

Fault detection/diagnosis has become a crucial function of the battery management system due to the increasing of lithium-ion batteries in highly sophisticated and high-power applications to ensure the safe and reliable operation of the system. The application of a classifier model in the battery management system of lithium-ion batteries may provide efficient, reliable, accurate prediction of several important states of the lithium-ion batteries, such as state of charge, state of health, and remaining useful life.

Quality Control of Solids

Quality inspection has become a crucial part of production and/or R&D of solids, e. g. catalysts and or battery material. In particular for quality control of solids, sensor data is acquired, such sensor data may be images obtained by a camera or from microscopic measurements. In other examples the sensor data may be spectra, obtained from measurements. Some sensor data may be labeled for training dependent whether or not the measured product did meet the quality specification.

One major problem in application of classification for industrial applications as mentioned above is the lack of data availability. In order to train classifiers with high accuracy large data sets are required. In industries each datum reflecting irrelevant data requires a fault in the industrial process. This makes it prohibitive to create irrelevant data, meaning data that does not fulfil quality criteria. The proposed method allows the application of classifier models in industrial application.

As the proposed training method needs a smaller set of training data, a great deal of effort, which is spent by laboratory personnel performing experiments and labelling the experimental data for training the above exemplary classifier models, may be greatly saved.

According to an embodiment of the present invention, step d) further comprises the following steps:
 d1) generating a classifier confidence score indicative of a probability of correctness of the classifier model working on the test dataset;
 d2) computing a classifier metric at different thresholds on classifier confidence score, the classifier metric representing a measure of a test's accuracy;
 d3) determining a reference threshold that corresponds to a peak in a distribution of the classifier metric over the threshold on classifier confidence score;
 d4) determining a threshold range that defines a recommended window according to a predefined criteria, wherein the reference threshold is located within the threshold range; and
 d5) computing the reward value at different thresholds on classifier confidence score.

There are many classifier metrics that can be used to measure the performance of the classifier. Recall, precision, and F-measure are common metrics used in information retrieval. Other examples of the classifier metrics may include, but are not limited to, the phi coefficient, Matthews correlation coefficient, informedness or Cohen's kappa.

The classifier metric represents a measure of a test's accuracy. For example, a higher value of the classifier metric, such as $F_2$ score, may lead to a lower global risk, e.g. lower risk of false negatives. The distribution of the classifier metric over the threshold on classifier confidence score thus reflects the performance of the classifier at different threshold levels.

The recommend window thus defines a threshold range, within which the thresholds on classifier confidence score yield lower deployment risk of false negatives.

In an example, the predefined criteria may specify that the recommended window is reference threshold ±0.1. In another example, the predefined criteria may specify that the recommended window is reference threshold ±1 standard deviation.

The reward value is also calculated at different thresholds on classifier confidence score. Typically, the higher threshold on classifier confidence score leads to a higher reward value. As the reward value may reflect human effort being saved on review, by inspection of the two plots of the reward value and classifier metric, the user may define a user-defined threshold value that yields desirable risk-reward pair for a particular use case.

This will be explained hereafter and in particular with respect to the embodiments shown in FIGS. 3 and 4.

According to an embodiment of the present invention, the classifier metrics comprises $F_2$ score.

The Fbeta-measure is a generalization of the F-measure that adds a configuration parameter called beta. A default beta value is 1.0, which is the same as the F-measure. A smaller beta value, such as 0.5, gives more weight to precision and less to recall, whereas a larger beta value, such as 2.0, gives less weight to precision and more weight to recall in the calculation of the score.

According to an embodiment of the present invention, step d) further comprises the following steps:
d6) receiving a user-defined threshold value that yields a desirable risk-reward pair for a use case based on a comparison of the global risk value and the reward value at the user-defined threshold value.

In other words, the user may determine whether to reduce the false-negative errors by increasing human effort on review, or to reduce human effort on review by increasing the false-negative errors. The user can balance the risk vs. reward trade-off by inspection of two plots of the global risk value and the reward value.

Figure 5:
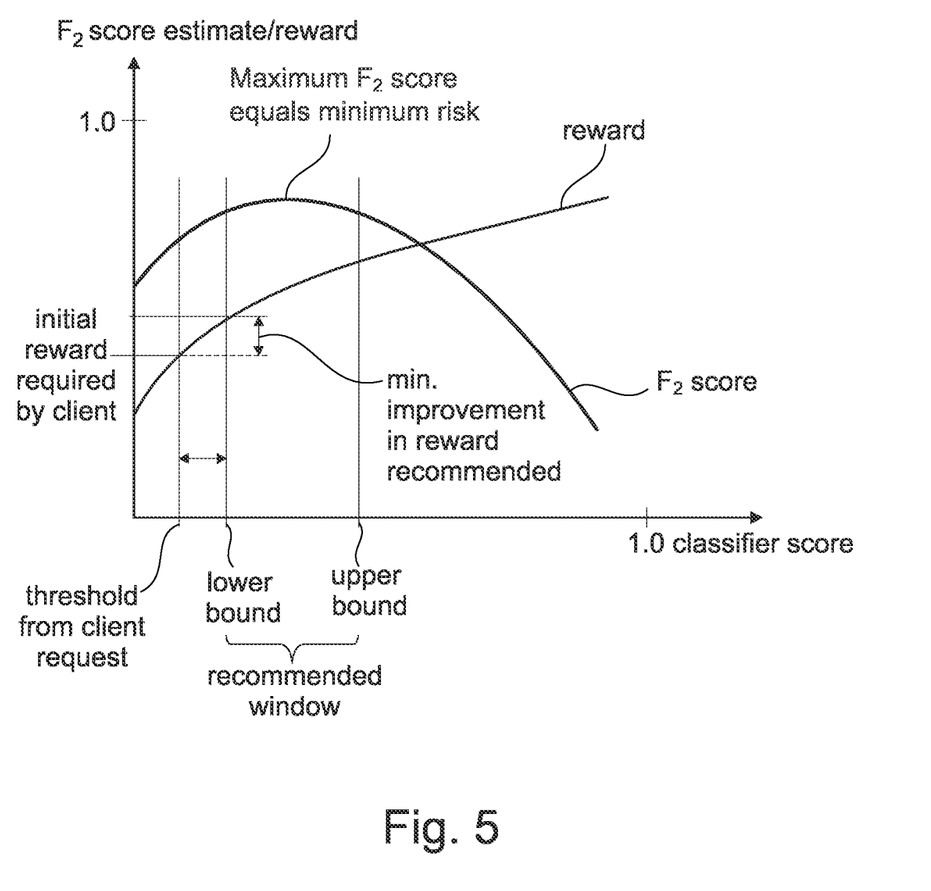
FIG. 5 illustrates an example of a user-defined threshold value that yields a desirable risk-reward pair.

This will be explained hereafter and in particular with respect with the embodiments shown in FIGS. 3 and 5.

According to an embodiment of the present invention, step a) further comprises the following steps:
a1) performing a search to find seed data based on the search query;
a2) selecting and annotating relevant and irrelevant seed data; and
a3) repeating steps a1) and a2) until the seed set has sufficient labeled seed data.

In other words, the seed dataset may be expanded by repeating steps a1) and a2), until a sufficiently large seed set is obtained.

According to an embodiment of the present invention, step a) further comprises:
a4) augmenting the seed set of labeled data by a data augmentation technique; wherein in step b), the classifier model is trained using the augmented seed set.

In other words, data augmentation technique may be used to expand the seed set.

According to an embodiment of the present invention, the data augmentation technique comprises data set expansion through sampling by similarity and active learning.

According to an embodiment of the present invention, the reward value includes at least one of a measure of information gain and a measure of decrease in uncertainty.

According to an embodiment of the present invention, the global risk value and the reward value are expressed as an algebraic expression in an objective function.

If the risk vs. reward trade-off can be expressed as an algebraic expression in an objective function and the generation of additional labeled data can be automated, then the workflow may be embedded in grid search optimization routine that guarantees a local optimum of the objective function.

According to an embodiment of the present invention, the data comprises at least one of: text data; image data, experimental data from chemical, biological, and/or physical experiments, plant operations data, business operations data, and machine-generated data in log files.

The data may be associated with any subject-matter, such as legal, scientific, and/or political. Information about documents may include data about the documents (e.g. metadata).

According to a second aspect of the present invention, there is provided a computer-implemented method for data classification, in particular in response to a search query. The computer-implemented method comprises:
receiving an search query or sensor data;
training a classifier model according to any one of the preceding embodiments;
applying the trained classifier model on new search results or uploaded data.

The application of supervised data classification thus has a-priori estimate of deployment risk. Accordingly, a risk vs. reward trade-off is estimated, which is expected from any application under economical constraints.

According to a third aspect of the present invention, there is provided an apparatus for data classification, in particular in response to a search query. The apparatus comprises:
an input unit configured to receive a search query;
a processing unit configured to carry out the method of any one of the preceding embodiments; and
an output unit configured to provide a processing result.

For example, the apparatus may be a desktop computer, laptop computer, or other mobile device.

According to a fourth aspect of the present invention, there is provided an information retrieval system. The information retrieval system comprises:
an apparatus according to the third aspect and any associated example; and
a data repository for storing data.

In an example, the apparatus and the data repository may be combined. For example, the apparatus may include the data repository.

In an example, the apparatus and the data repository may be separate components. For example, a network may facilitate communication between the apparatus and the data repository.

According to an embodiment of the present invention, there is provided a computer program element for an apparatus according to an apparatus according to the third aspect, which when being executed by a processor is configured to carry out the method according to the first and/or the second aspect, and any associated example.

According to a further aspect of the present invention, there is provided a computer-implemented method of predicting quality of a product, the method comprising the steps of providing sensor data associated with the product;
providing a classifier model trained according to the training method disclosed herein, the model relating historical quality classifiers of the product to historic sensor data;
determining a quality classifier based on the trained classifier model and the sensor data; and
providing control data associated with the quality classifier.

In an example, the control data may be the quality classifier, which allows convenient monitoring of a plant.

In another example, the control data may be suitable for controlling a plant. For example, the control data may provide a stop signal to the production plant, such that production is stopped, when the product quality does no longer meet the quality criteria.

According to another aspect of the present invention, there is provided a computer readable medium having stored thereon the program element.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

Disclosed apparatuses, systems, and methods may facilitate a search and identify data objects. To do so, risk and reward are estimated during training, which allows to give an economical stop criteria to minimize the training effort given a risk vs. reward objective. Disclosed apparatuses, systems, and methods may be applied to supervised text classification in technology monitoring, but are generally applicable to any supervised binary data classification task. Disclosed apparatuses, systems, and methods are also applicable to any supervised multi-classification, since an n-class (n>2) multi-classification can be translated into n−1 binary classification tasks. Data examples may include image data, experimental data from chemical, biological, and physical experiments, plant operation data, business operation data, machine-generated data in log files, etc.

Figure 1:
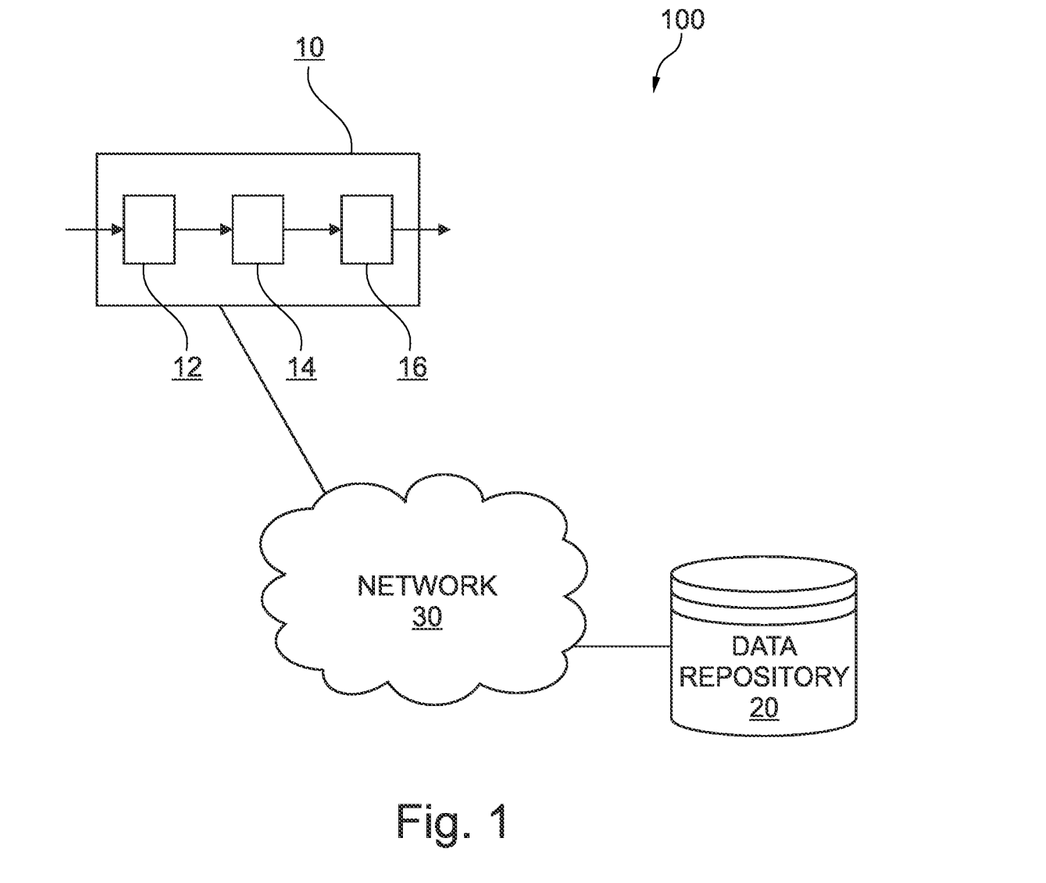
FIG. 1 illustrates an exemplary block diagram of an information retrieval system.

FIG. 1 is an exemplary block diagram of an information retrieval system 100. Although a specific number of components are depicted in FIG. 1, any number of these components may be provided. Furthermore, the functions provided by one or more components of the information retrieval system 100 may be combined or separated. Moreover, the functionality of any one or more components of the information retrieval system 100 may be implemented by any appropriate computing environment.

With reference to FIG. 1, the information retrieval system 100 may include an apparatus 10, a data repository 20, and a network 30.

The apparatus 10 may be used for performing computing tasks, such as legal research, technology monitoring, and other types of research. The apparatus 10 may be used for data classification, in particular in response to a search query. For example, the apparatus 10 may be a desktop computer, laptop computer, or other mobile device. The apparatus 10 may include an input unit 12, a processing unit 14, and an output unit 16.

The input unit 12 may be, in an example, implemented as an Ethernet interface, a USB™ interface, a wireless interface such as a WiFi™ or Bluetooth™ or any comparable data transfer interface enabling data transfer between input peripherals and the processing unit 14. Furthermore, the input unit 12 may access data over the network 30.

The processing unit 14 may execute computer program instructions to perform various processes and methods. The processing unit 14 may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logical circuit, and/or other suitable components that provide the described functionality. Furthermore, such processing unit 14 may be connected to volatile or non-volatile storage, display interfaces, communication interfaces and the like as known to a person skilled in the art.

The output unit 16 may be in an example, implemented as an Ethernet interface, a USB™ interface, a wireless interface such as a WiFi™ or Bluetooth™ or any comparable data transfer interface enabling data transfer between output peripherals and the processing unit 14.

Optionally, the apparatus 10 may have a user interface (not shown). The user interface may access user data, such as a user supplied query. In some examples, the user interface may be separate from the apparatus 10. The user interface may also include a visual display.

The data repository 20 is a datastore that stores data including, for example, image data, experimental data from chemical, biological, and physical experiments, plant operation data, business operation data, and/or machine-generated data in log files. The data repository 20 may be any type of datastore including a server, a database, a file, etc.

Further, the stored data may be associated with any subject-matter, such as scientific.

The network 30 may facilitate communications between various devices in the information retrieval system 100, such as the apparatus 10 and the data repository 20. The network 30 may be a shared, public or private network. The network 30 may encompass a wide area or local area and may be implemented through any suitable combination of wired and/or wireless communication networks. Furthermore, the network 30 may comprise a local area network (LAN), a wide area network (WAN), an intranet, or the internet.

Moreover, although shown as separate components in FIG. 1, the apparatus 10 and the data repository 20 may be combined. For example, the apparatus 10 may include one or more databases in addition to or instead of the data repository 20. The data repository 20 may also be distributed over multiple databases.

Figure 2:
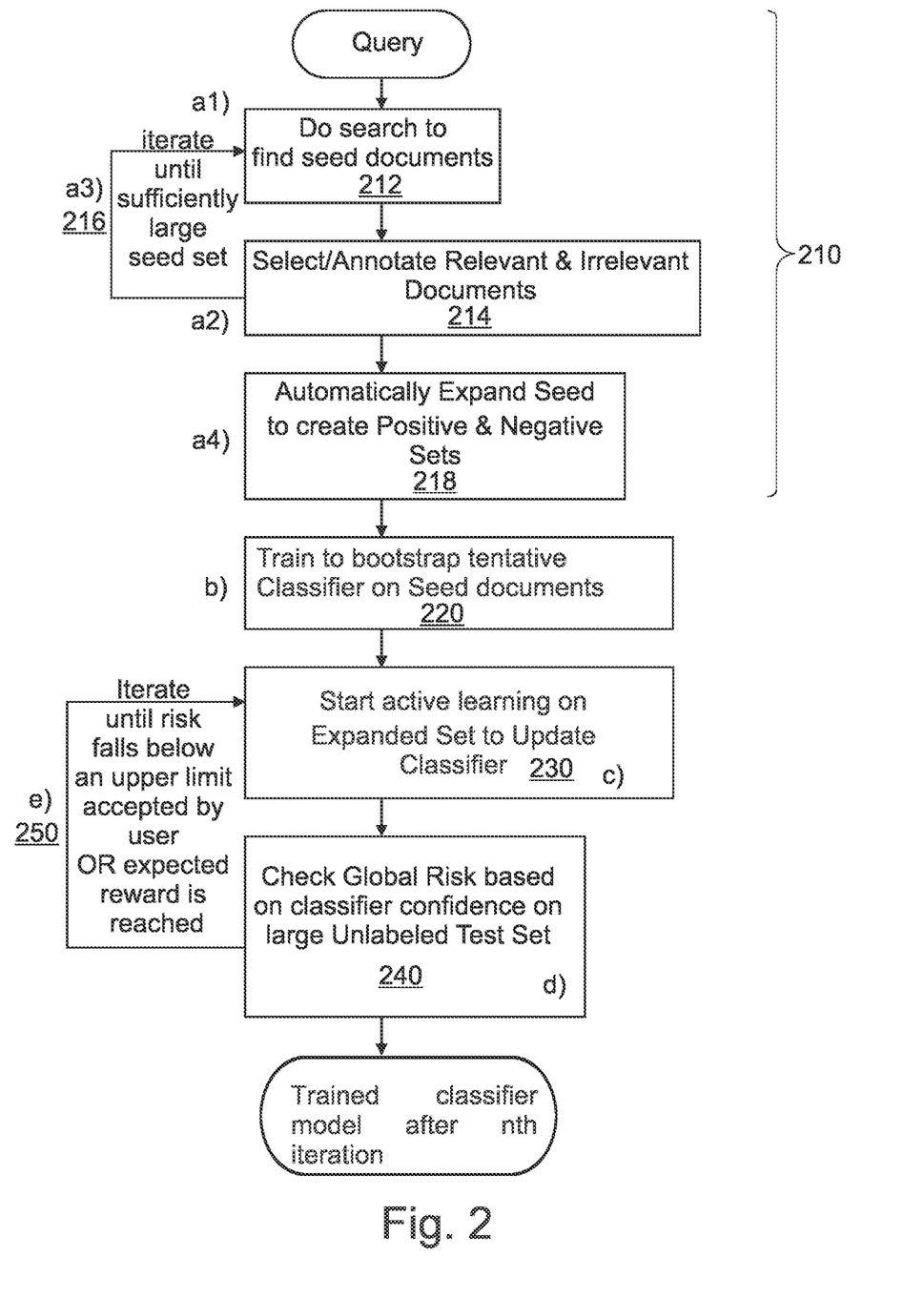
FIG. 2 illustrates a flow diagram of a computer-implemented method for training a classifier model for data classification.

FIG. 2 illustrates a flow diagram illustrating a computer-implemented method 200 for training a classifier model for data classification. To facilitate the understanding of the disclosed methods, in the examples shown in FIG. 2, the seed data is generated by a document search. In general, any type of data curation or selection process can replace the document search.

The computer-implemented method 100 may be implemented as a device, module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 100 may be written in any combination of one or more programming languages, including a language such as JAVA, SMALLTALK, C++, Python, TypeScript, JavaScript or the like and conventional procedural programming languages, such as the "C" programming language or similar programming languages. As an example, the method 200 may be executed by the processing unit 14, along or in conjunction with other components.

In step 210, i.e. step a), a dataset is obtained that comprises a seed set of labeled data representing a training dataset.

Optionally, step 210 may further comprise one or more of the following steps.

In step 212, i.e. step a1), the apparatus 10 may receive a query, for example, a search query for documents. The query may be received from a user via a user interface or may be automatically generated. The apparatus 10 then identifies a list of initial documents that are generally relevant to the query. These initial documents may be identified according to a frequency with which query terms occur within the initial documents, the proximity with which query terms occur within the initial documents, and/or other factors. The list of initial documents then form the dataset.

In step 214, i.e. step a2), the user may select a list of relevant and irrelevant documents from the initial documents and annotate them via the user interface. The labeled relevant and irrelevant documents then form a seed set of training data.

In step 216, i.e. step a3), steps 212 and 214 may be repeated until a sufficiently large seed set of labeled data is obtained.

In step 218, i.e. step a4), the seed set of labeled documents may be automatically expanded using a data augmentation technique to create a sufficiently large seed set of labeled data. For example, the data augmentation technique may achieve data set expansion through sampling by similarity and active learning.

In step 220, i.e. step b), a classifier model for data classification is trained on the seed set of labeled data to fit parameters of the classifier model.

In step 230, i.e. step c), a quality of the classifier model is evaluated using a test dataset that comprises unlabeled data from the obtained dataset to generate a classifier confidence score indicative of a probability of correctness of the classifier model working on the test dataset.

The test dataset is a dataset that is independent of the training dataset, but that follows the same probability distribution as the training dataset. If a model fit to the training dataset also fits the test dataset well, minimal overfitting has taken place. A test set is therefore a set of examples used only to assess the performance (i.e. generalization) of a fully specified classifier. One approach to deciding whether to trust a classifier's decision is to use the classifiers' own reported confidence score, e.g. probabilities from the softmax layer of a neural network, distance to the separating hyperplane in support vector classification, or mean class probabilities for the trees in a random forest.

In step 240, i.e. step d), a global risk value of misclassification and a reward value are determined based on the classifier confidence score on the test dataset.

The global risk value provides a measure to estimate the deployment risk of false negatives in the irrelevant class, namely risk of overlooking of relevant items during deployment of trained classifier.

The reward value is used to measure the predetermined desired quality of the labels, thus providing a measure to estimate human effort being saved on review. The reward value may include at least one of a measure of information gain and a measure of decrease in uncertainty. Information gain may be measured in the standard information theoretical sense, e.g., the decrease in uncertainty from the prior distribution to the posterior over the classes.

Figure 3:
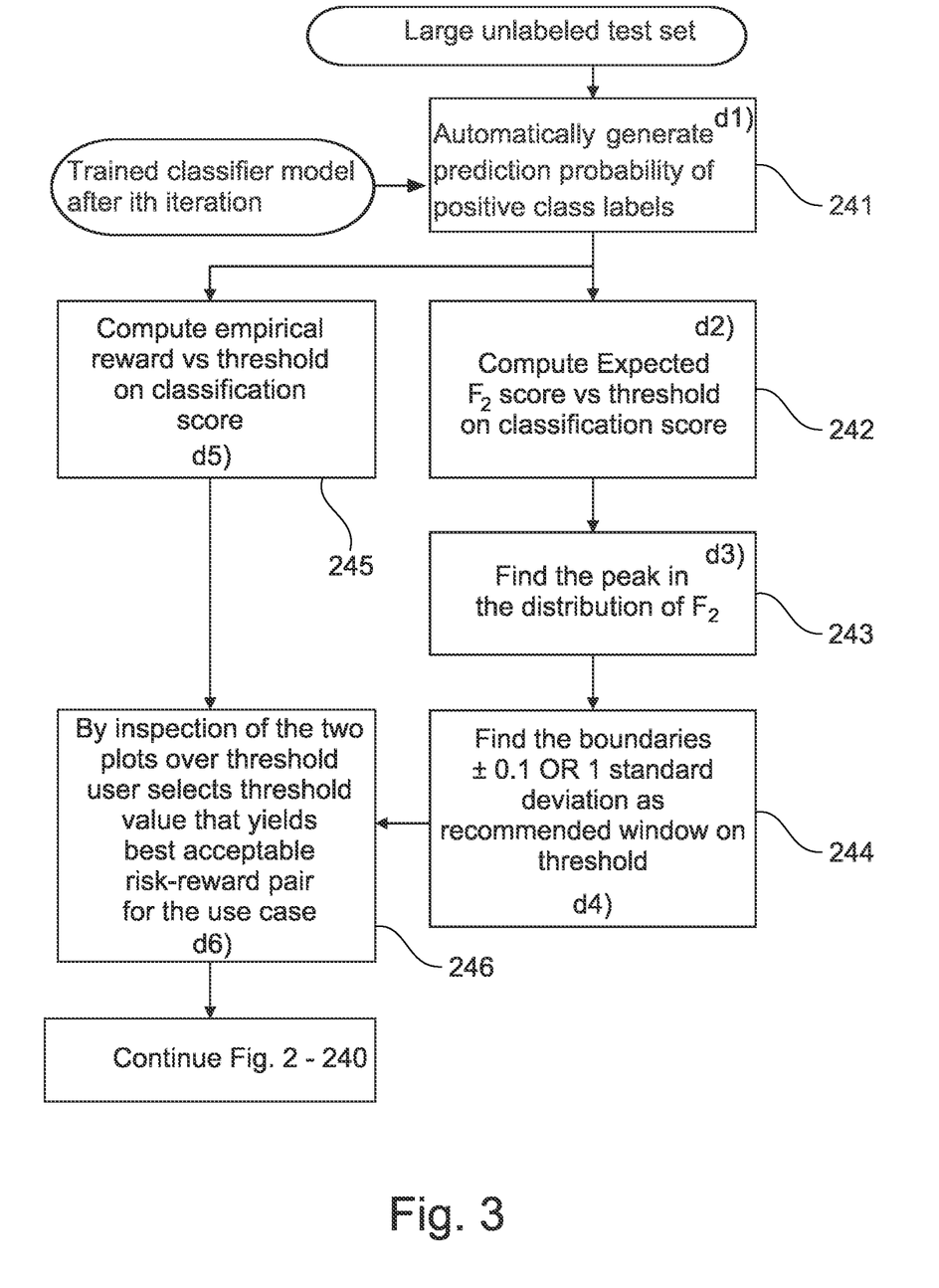
FIG. 3 illustrates a flow diagram of an exemplary method for determining the global risk value of misclassification.

An exemplary method for determining the global risk value and the reward value of misclassification is illustrated in FIG. 3.

In step 250, i.e. step e), the parameters of the classifier model is iteratively updated and steps b) to d) are iteratively performed until the global risk value falls within a predetermined risk limit value or an expected reward value is reached.

If the global risk falls below an upper limit or an expected reward, the training process is finished. The trained classifier model can then be applied on new search results or uploaded documents.

In the proposed training method, the risk vs. reward trade-off may help to maximize the human effort being saved on review given an acceptable risk of false negatives. Further, stop criteria are provided (i.e. the global risk value falls within a predetermined risk limit value or an expected reward value is reached), so training effort of classifier can be minimized.

If the risk vs. reward trade-off can be expressed as an algebraic expression in an objective function and the generation of additional labeled data can be automated, then the workflow shown in FIG. 2 may be embedded in grid search optimization routine that guarantees a local optimum of the objective function.

FIG. 3 illustrates a flow diagram illustrating exemplary method steps of step 240, i.e. the determination of the global risk value of misclassification and the reward value.

In step 241, i.e. step d1), a classifier confidence score indicative of a probability of correctness of the classifier model working on the test dataset is generated.

In step 242, i.e. step d2), a classifier metric representing a measure of a test's accuracy are calculated at different thresholds on classifier confidence score.

In an example, the classifier metric may be an Fbeta-measure, which is a configurable single-score metric for evaluating a binary classification model based on the predictions made for the positive class. The Fbeta-measure is calculated using precision and recall. Precision is a metric that calculates the percentage of correct predictions for the positive class. Recall calculates the percentage of correct predictions for the positive class out of all positive predictions that could be made. Maximizing precision will minimize the false-positive errors, whereas maximizing recall will minimize the false-negative errors.

The F-measure is calculated as the harmonic mean of precision and recall, giving each the same weighting. It allows a model to be evaluated taking both the precision and recall into account using a single score, which is helpful when describing the performance of the model and in comparing models. The Fbeta-measure is a generalization of the F-measure that adds a configuration parameter called beta. A default beta value is 1.0, which is the same as the F-measure. A smaller beta value, such as 0.5, gives more weight to precision and less to recall, whereas a larger beta value, such as 2.0, gives less weight to precision and more weight to recall in the calculation of the score.

Figure 4:
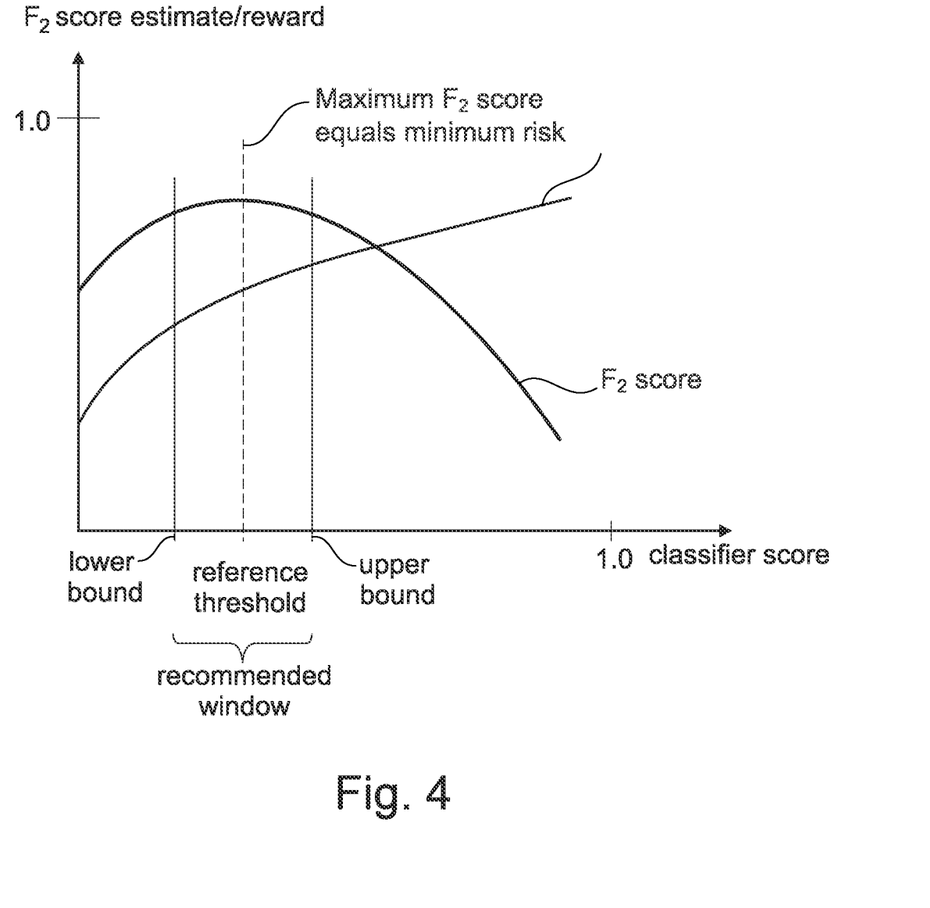
FIG. 4 illustrates an exemplary curve showing a distribution of a classifier metric and a reward value at different threshold values.

FIG. 4 presents an exemplary curve illustrating a relationship between a classifier metric and a threshold on classifier confidence score. In this example, the classifier metric is a $F_2$ score. The numbers in brackets on the Y-axis indicate the $F_2$ score. The numbers in brackets on the X-axis indicate the threshold on classifier confidence score.

As the classifier metric represents a measure of a test's accuracy, the higher classifier metric leads to the lower global risk. Therefore, the peak of the curve of the classifier metric, such as $F_2$ score in FIG. 4, represents the minimum global risk value of misclassification.

Turning to FIG. 3, in step 243, i.e. step d3), a reference threshold is determined. The reference threshold corresponds to a peak in a distribution of the classifier metric over the threshold on classifier confidence score. In other words, the global risk has a minimum value at the reference threshold.

In step 244, i.e. step d4), a threshold range is determined according to a predefined criteria. The threshold range defines a recommended window, within which the reference threshold is located.

In an example, the predefined criteria may specify that the recommended window is reference threshold ±0.1. In another example, the predefined criteria may specify that the recommended window is reference threshold ±1 standard deviation.

In step 245, i.e. step d5), the reward value is computed at different thresholds on classifier confidence score.

In step 246, i.e. step d6), by inspection of the two plots in FIG. 4, the user may define a user-defined threshold value that yields desirable risk-reward pair for a particular use case. For example, as illustrated in FIG. 5, the user may specify a threshold value out of the recommended window. The user-defined threshold value yields a corresponding global risk and a corresponding reward, which can be compared with the risk-reward pair e.g. at a lower bound of the recommended window.

In an example, the user may select a threshold value to increase the reward value (more human effort being saved on review) while increasing the risk of misclassification for one use case. In an example, the user may select a threshold value to reduce the risk of misclassification while reducing reward value (e.g. less human effort being saved on review) for another use case.

Figure 6:
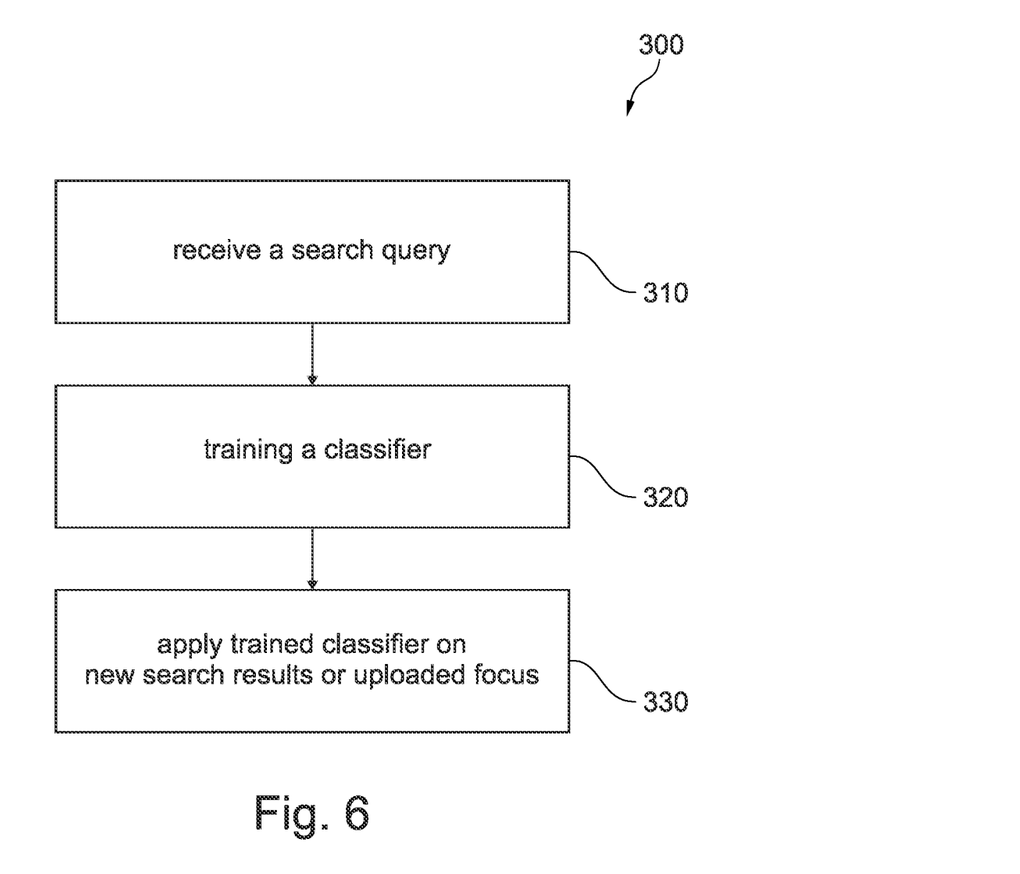
FIG. 6 illustrates a flow diagram of a computer-implemented method for data classification in response to a search query.

FIG. 6 illustrates a flow diagram illustrating a computer-implemented method 300 for data classification in response to a search query. The method 300 may be executed by the processing unit 13, along or in conjunction with other components.

In general, the computer-implemented method 300 may be implemented as a device, module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 300 may be written in any combination of one or more programming languages, including a language such as JAVA, SMALL-TALK, C++, Python, TypeScript, JavaScript or the like and conventional procedural programming languages, such as the "C" programming language or similar programming languages.

In step 310, a search query is received. The query may be received from a user via a user interface or may be automatically generated.

In step 320, a classifier model is trained according to the above-described training method.

In step 330, the trained classifier model is applied on new search results or uploaded data.

In some examples, a computer-implemented method may be provided for predicting quality of a product in quality control production.

In a first step, sensor data associated with the product is provided. For example, the sensor data may be obtained from an inspection camera supervising the product.

In a second step, a classifier model is provided, which has been trained according to the training method disclosed herein. The classifier model relates historical quality classifiers of the product to historic sensor data. For examples, labels may be provided according to the quality of the product meeting a quality criterion to a portion of the provided sensor data. The labels may be used to identify the quality classifier of the product.

In a third step, a quality classifier is determined based on the trained classifier model and the sensor data.

In a fourth step, control data associated with the quality classifier is provided. In some examples, the control data may be the quality classifier, which allows convenient monitoring of a plant. In some examples, the control data may be suitable for controlling a plant. For example, the control data may provide a stop signal to the production plant, such that production is stopped, when the product quality does no longer meet the quality criteria.

It should also be understood that, unless clearly indicated to the contrary, in any methods claimed herein that include more than one step or act, the order of the steps or acts of the method is not necessarily limited to the order in which the steps or acts of the method are recited.

All definitions, as defined and used herein, should be understood to control over dictionary definitions, definitions in documents incorporated by reference, and/or ordinary meanings of the defined terms.

The indefinite articles "a" and "an", as used herein in the specification and in the claims, unless clearly indicated to the contrary, should be understood to mean "at least one".

The phrase "and/or", as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either", "one of", "only one of", or "exactly one of".

As used herein in the specification and in the claims, the phrase "at least one", in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising", "including", "carrying", "having", "containing", "involving", "holding", "composed of", and the like are to be understood to be open-ended, i.e., to mean including but not limited to. Only the transitional phrases "consisting of" and "consisting essentially of" shall be closed or semi-closed transitional phrases, respectively.

Furthermore, in this detailed description, a person skilled in the art should note that quantitative qualifying terms such as "generally", "substantially", "mostly", and other terms are used, in general, to mean that the referred to object, characteristic, or quality constitutes a majority of the subject of the reference. The meaning of any of these terms is dependent upon the context within which it is used, and the meaning may be expressly modified.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an update turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

All features can be combined to provide a synergetic effect that is more than the simple summation of the features.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A computer-implemented method for training a classifier model for data classification, in particular in response to a search query, comprising:
   a) obtaining a dataset that comprises a seed set of labeled data representing a training dataset;
   b) training the classifier model by using the training dataset to fit parameters of the classifier model;
   c) evaluating a quality of the classifier model using a test dataset that comprises unlabeled data from the obtained dataset to generate a classifier confidence score indicative of a probability of correctness of the classifier model working on the test dataset;
   d) determining a global risk value of misclassification and a reward value based on the classifier confidence score on the test dataset;
   e) iteratively updating the parameters of the classifier model and performing steps b) to d) until the global risk value falls within a predetermined risk limit value or an expected reward value is reached to obtain a trained classifier model for data classification,
   wherein step d) further comprises:
   d1) generating a classifier confidence score indicative of a probability of correctness of the classifier model working on the test dataset;
   d2) computing a classifier metric at different thresholds on classifier confidence score, the classifier metrics representing a measure of a test's accuracy;
   d3) determining a reference threshold that corresponds to a peak in a distribution of the classifier metric over the threshold on classifier confidence score;
   d4) determining a threshold range that defines a recommended window according to a predefined criteria, wherein the reference threshold is located within the threshold range; and
   d5) computing the reward value at different thresholds on classifier confidence score, and
   wherein the reward value includes at least one of a measure of information gain and a measure of decrease in uncertainty.

2. The computer-implemented method according to claim 1, wherein the classifier metrics comprises $F_2$ score.

3. The computer-implemented method according to claim 1, wherein step d) further comprises:
   d6) receiving a user-defined threshold value that yields a desirable risk-reward pair for a use case based on a comparison of the global risk value and the reward value at the user-defined threshold value.

4. The computer-implemented method according to claim 1, wherein step a) further comprises:
   a1) performing a search to find seed documents based on the search query;
   a2) selecting and annotating relevant and irrelevant seed documents; and
   a3) repeating steps a1) and a2) until the seed set has sufficient labeled seed documents.

5. The computer-implemented method according to claim 1, wherein step a) further comprises:
   a4) augmenting the seed set of labeled data by a data augmentation technique; and
   wherein in step b), the classifier model is trained using the augmented seed set.

6. The computer-implemented method according to claim 5, wherein the data augmentation technique comprises data set expansion through sampling by similarity and active learning.

7. The computer-implemented method according to claim 1, wherein the global risk value and the reward value are expressed as an algebraic expression in an objective function.

8. The computer-implemented method according to claim 1, wherein the data comprises at least one of: text data; image data; experimental data from chemical, biological, and/or physical experiments; plant operations data, business operations data; and machine-generated data in log files.

9. A non-transitory computer readable medium having stored thereon a program element of, which when being executed by a processor is configured to carry out a computer-implemented method for training a classifier model for data classification, in particular in response to a search query, the computer-implemented method comprising:
   a) obtaining a dataset that comprises a seed set of labeled data representing a training dataset;
   b) training the classifier model by using the training dataset to fit parameters of the classifier model;
   c) evaluating a quality of the classifier model using a test dataset that comprises unlabeled data from the obtained dataset to generate a classifier confidence score indicative of a probability of correctness of the classifier model working on the test dataset;
   d) determining a global risk value of misclassification and a reward value based on the classifier confidence score on the test dataset;
   e) iteratively updating the parameters of the classifier model and performing steps b) to d) until the global risk value falls within a predetermined risk limit value or
   an expected reward value is reached to obtain a trained classifier model for data classification, wherein step d) further comprises:
   d1) generating a classifier confidence score indicative of a probability of correctness of the classifier model working on the test dataset;
   d2) computing a classifier metric at different thresholds on classifier confidence score, the classifier metrics representing a measure of a test's accuracy;
   d3) determining a reference threshold that corresponds to a peak in a distribution of the classifier metric over the threshold on classifier confidence score;
   d4) determining a threshold range that defines a recommended window according to a predefined criteria, wherein the reference threshold is located within the threshold range; and
   d5) computing the reward value at different thresholds on classifier confidence score, and
   wherein the reward value includes at least one of a measure of information gain and a
   measure of decrease in uncertainty.

* * * * *